(12) United States Patent
Abrahamian

(10) Patent No.: US 7,275,872 B2
(45) Date of Patent: Oct. 2, 2007

(54) ADJUSTABLE BEARING

(75) Inventor: David J. Abrahamian, Williamsville, NY (US)

(73) Assignee: Cameron International Corporation, Houston, TX (US)

( * ) Notice: Subject to any disclaimer, the term of this patent is extended or adjusted under 35 U.S.C. 154(b) by 87 days.

(21) Appl. No.: 11/060,857

(22) Filed: Feb. 18, 2005

(65) Prior Publication Data

US 2006/0188188 A1 Aug. 24, 2006

(51) Int. Cl.
*F16C 23/02* (2006.01)
*F16H 55/18* (2006.01)

(52) U.S. Cl. .................. 384/255; 384/312; 74/395; 74/409

(58) Field of Classification Search ................ 384/255, 384/447, 309, 310, 312; 74/409, 390, 392, 74/395, 396, 397
See application file for complete search history.

(56) References Cited

U.S. PATENT DOCUMENTS

| | | | | |
|---|---|---|---|---|
| 817,271 | A * | 4/1906 | Perks | 30/292 |
| 1,443,685 | A * | 1/1923 | Huff | 384/255 |
| 1,887,832 | A * | 11/1932 | Brown | 74/397 |
| 2,920,497 | A * | 1/1960 | Wiken | 384/255 |
| 3,150,533 | A * | 9/1964 | Wallgren | 74/392 |
| 3,286,994 | A * | 11/1966 | Manna | 416/150 |
| 3,542,441 | A * | 11/1970 | Nixon | 384/312 |
| 3,888,134 | A * | 6/1975 | Miranda | 384/255 |
| 4,035,044 | A * | 7/1977 | Miyazaki | 384/447 |
| 4,039,228 | A * | 8/1977 | Repose et al. | 384/312 |
| 4,460,283 | A * | 7/1984 | Yoshioka et al. | 384/119 |
| 4,569,423 | A * | 2/1986 | Hirano | 384/255 |
| 5,097,718 | A * | 3/1992 | Sahara | 74/396 |
| 5,634,725 | A * | 6/1997 | Chester | 384/117 |
| 6,398,400 | B1 * | 6/2002 | Nienhaus | 384/255 |
| 6,622,877 | B2 * | 9/2003 | Plass | 384/255 |

* cited by examiner

*Primary Examiner*—Thomas R. Hannon
(74) *Attorney, Agent, or Firm*—Manish Vyas; Peter Belinski; Fletcher Yoder

(57) ABSTRACT

A bearing that can be reoriented to move its center is disclosed. The center of the bearing is offset from the center of its outer housing. Should the shaft extending through the bearing need to be raised or lowered the outer housing is simply rotated in its receptacle and its position is fixed. Reconfiguring the bearing receptacle or using shims is eliminated and the alignment process is rendered shorter and more reliable future operation is obtained.

19 Claims, 4 Drawing Sheets

BEFORE DIALING

AFTER DIALING

ADJUSTABLE BEARING

FIELD OF THE INVENTION

The field of the invention is a bearing design that incorporates an ability to accommodate misalignment by adjusting the bearing center position.

BACKGROUND OF THE INVENTION

Alignment of driving and driven components comes up in a variety of applications. One example is a gearbox where a driving gear needs to mesh with one or more driven gears. The gearbox housing is generally horizontally split between and upper and lower housing. At the split the housing halves are formed to accept shaft bearings. When the gearbox is used to drive multistage centrifugal compressors, for example, there may be two or more driven gears that need to be properly aligned with the driving gear. The cutout at the split that accepts the bearing is precision machined and the bearing outer housing is a close fit by design. In the past if adjustments to the position of the driving gear needed to be made after the initial assembly to the gearbox lower housing, there were two main alternatives to make an adjustment. Both these choices required significant trial and error and consumed a lot of time and for that reason turned out to be expensive and uncertain from a longevity perspective. One way to fix misalignment in the past if, for example the bearing needed to be raised vertically was to add material to the lower housing half where the bearing mounts and remove a similar amount of metal above to retain the shape of the opening accepting the bearing but to relocate its center upward. This procedure was done in steps in a trial and error manner to avoid overcorrecting for the targeted center location for the bearing. Another technique was to add shims below the bearing in the lower case half and remove material from the upper case half. Again this process was done incrementally, to avoid removing too much material above the bearing. Using either technique took a lot of time and was costly and still left concerns regarding long term reliability of the assembly maintaining the desired bearing position.

What was needed and provided by the present invention is a way to alter the bearing center position without having to add material and remove material from the housing halves and without resorting to using shims instead of another procedure to add metal to alter the bearing position with respect to the housing. The present invention allows this to be done by providing a bearing center offset from the outer bearing housing center. Should a vertical adjustment be needed, the bearing housing can be rotated and locked into position. The housing halves for the gearbox or other structure where the bearings are mounted does not need to be modified. The changes can be made rapidly saving time and money and the long term reliable running is more assured. Those skilled in the art will appreciate all the aspects of the present invention from the detailed description of the preferred embodiment and the claims, which appear below.

SUMMARY OF THE INVENTION

A bearing that can be reoriented to move its center is disclosed. The center of the bearing is offset from the center of its outer housing. Should the shaft extending through the bearing need to be raised or lowered the outer housing is simply rotated in its receptacle and its position is fixed. Reconfiguring the bearing receptacle or using shims is eliminated and the alignment process is rendered shorter and more reliable future operation is obtained

DETAILED DESCRIPTION OF THE DRAWINGS

DETAILED DESCRIPTION OF THE PREFERRED EMBODIMENT

Figure 1:
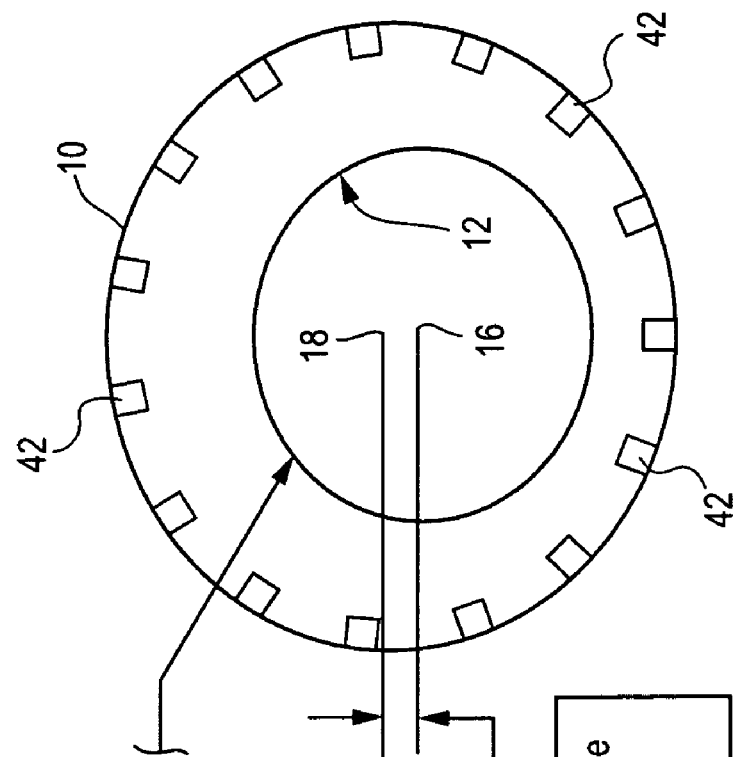
FIG. 1 is a schematic view showing the offset centers of the bearing and its outer housing.
Figure 2:
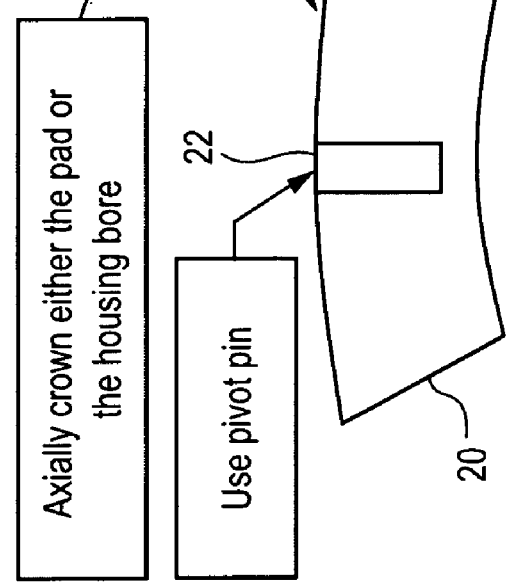
FIG. 2 is a detail of mounting a tilting pad as part of the bearing using a pin mount.
Figure 2A:
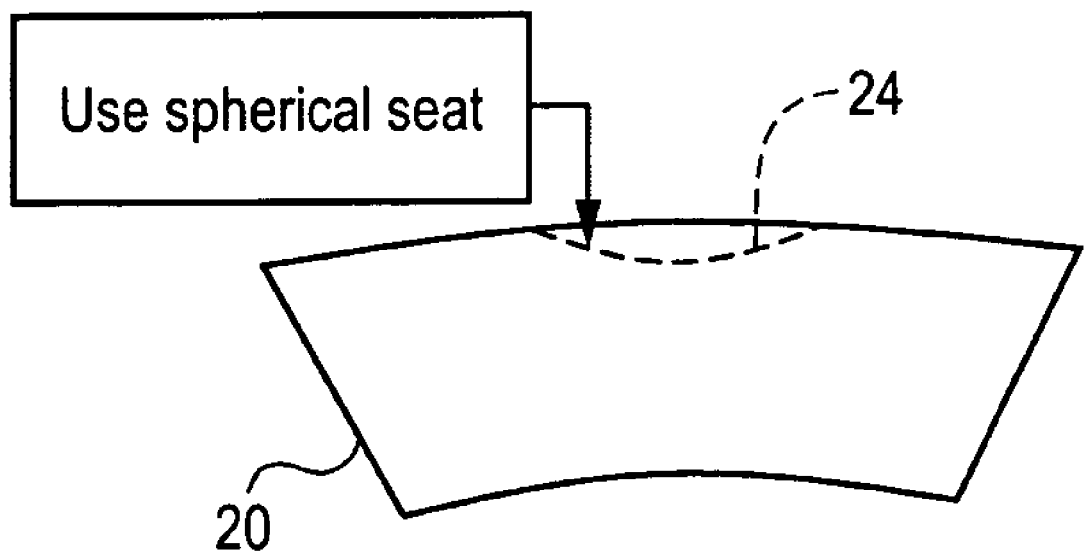
FIG. 2a is the view of FIG. 2 with the bearing having a spherical mount in place of the pin mount.
Figure 3:
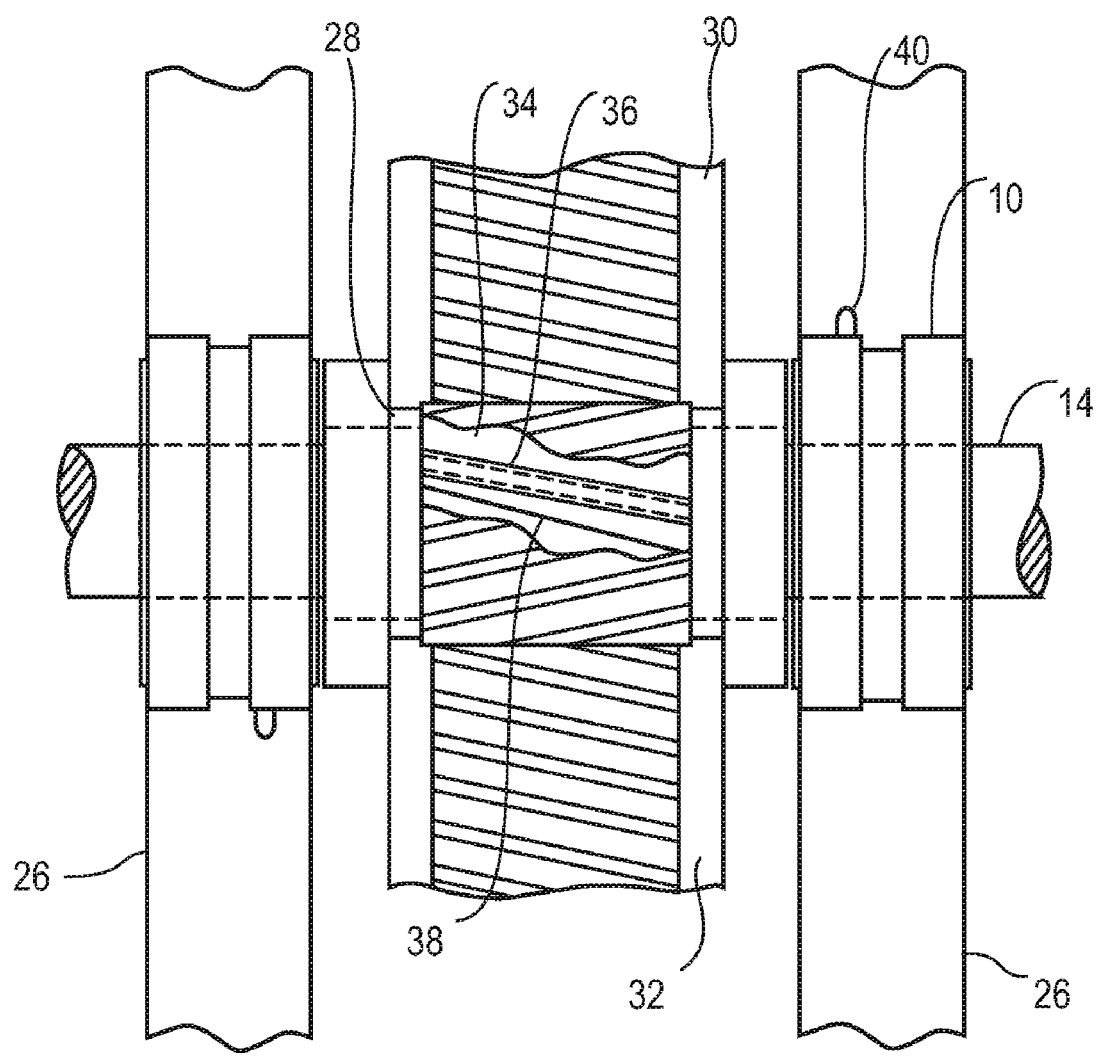
FIG. 3 shows an application in a gearbox with the shaft in position where the gears are not aligned.
Figure 4:
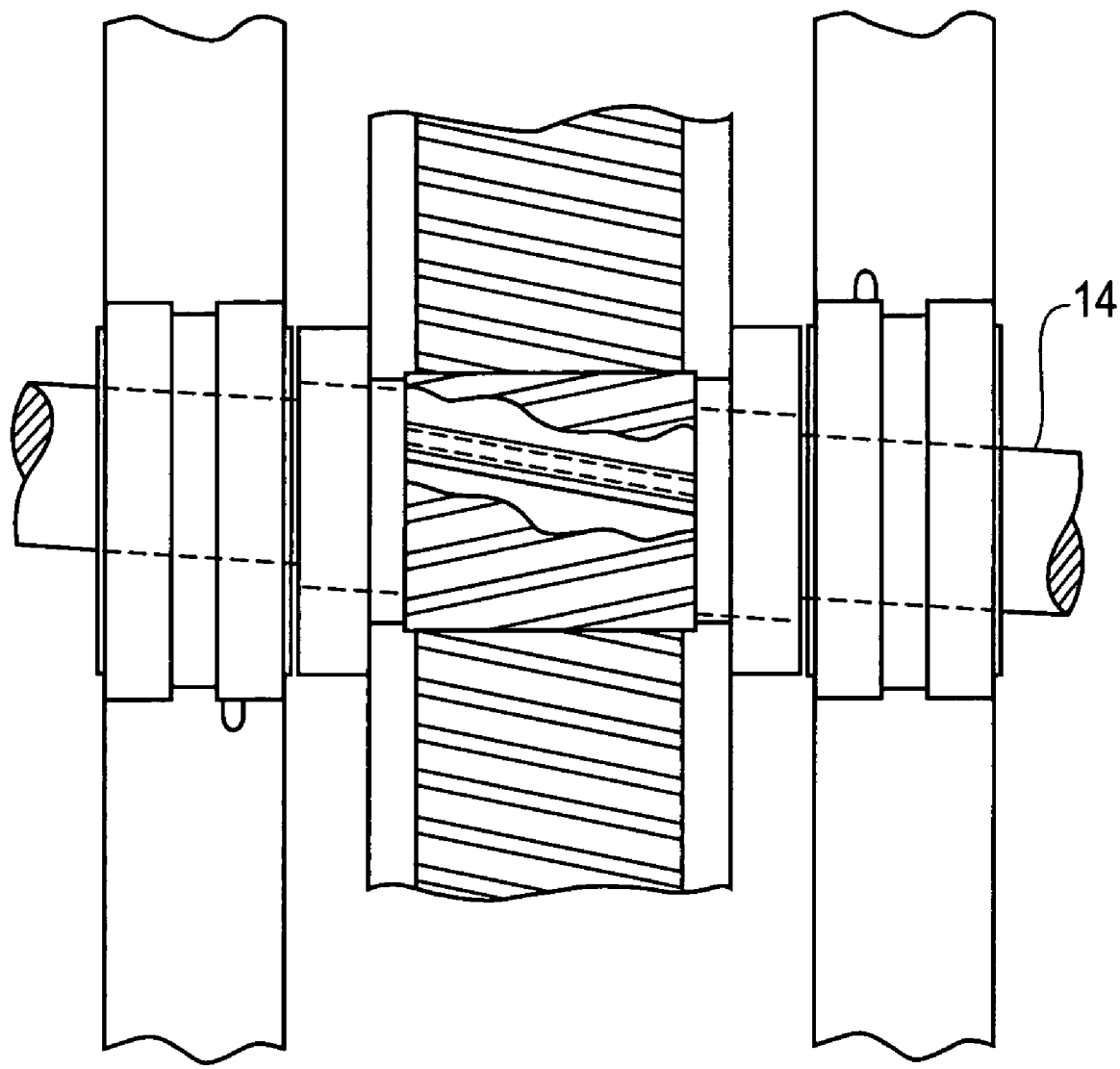
FIG. 4 is the view of FIG. 3 after both outer bearing housings have been rotated to bring the gear teeth into alignment.

FIG. 1 shows a schematic bearing that has a circular outer housing 10 and a bore 12 to accept a shaft 14 (see FIGS. 3 and 4). The bore 12 has a center 16 that is offset from the center 18 of the bearing housing 10. The bore 12 features a plurality of pads 20 that can be mounted so that they can tilt by mounting them using a pin 22 or a spherical mount 24. Although the preferred embodiment is illustrated as a tilting pad bearing other styles of bearings can be used within the scope of the invention. One example could be a roller or ball bearing where some or the rollers or balls are a different size than the others so as to get the center of the inner race offset from the center of the outer race.

Referring to FIGS. 3 and 4 an example of the application of the invention is illustrated in a gearbox that is fitted to a centrifugal compressor having multiple stages. Again this is by way of illustration and many other applications are envisioned. Typically, the gearbox housing is horizontally split and comprises an upper half and a lower half. Portions of the lower half 26 are shown. It has a semi-circular end recess to accept the lower portion of the bearing. The upper half is assembled to the lower half to fully surround the bearing housing 10. In FIG. 3 a driving gear 30 meshes with driven gears 28 and 32. A cutaway 34 indicates in FIG. 3 that the involute gear patterns are not properly aligned because the dashed line 36 is not parallel to the solid line 38. This means that the shaft 14 needs to be repositioned. This is easily done with the present invention. The outer housing 10 has an index pin 40 that can be installed in any one of several bores 42 in the exterior of the bearing housing 10. The spacing of these bores 42 can be uniform or random. The quantity and position of the bores 42 in the exterior of housing 10 should be sufficient to allow it to be repositioned rotationally in opposed directions so that the center 16 can be raised or lowered or moved left or right or obliquely. If the center 16 is initially assembled at its lowermost point, then any rotation of the housing 10 will raise it. The only difference will be whether the center 16 moves left or right while moving up. Lower half 26 has a cutout to accept half of the pin 40 that extends from housing 10. The upper housing half that mounts over the horizontal split has a similar recess to accept the upper half of the pin 40. In this manner, when the gearbox housing halves are assembled, the axial position and rotational position of the bearing housing 10 is fixed. If changes are still required, the upper half of the gearbox housing can be removed and the bearing housings rotated a like amount or differing amounts to reposition the center 16 in each bearing so that the gear teeth represented by lines 36 and 38 can come into the needed alignment. It should be noted that raising and lowering is the more significant movement in attempting alignment of the gears. While some amount of in or out movement is associated with moving the centers 16 up or down, the meshing gears of the design illustrated in FIGS. 3 and 4 can withstand the anticipated in or out movement associated with moving the centers 16 up or down without adverse operational effects.

I claim:

1. A bearing, comprising:
    a bearing housing defining an outer periphery for contact with a surrounding housing, wherein the bearing housing defines an interior bore having a center eccentric from a center of the outer periphery;
    an indexing feature connected to the bearing housing, wherein the indexing feature is configured to engage the surrounding housing to maintain the outer periphery in a predetermined orientation against axial movement along an axis aligned with the center of the bore, and wherein the indexing feature comprises a plurality of spaced bores on the outer periphery and a pin to be selectively inserted into one of the bores; and
    at least one tilting pad oriented toward the interior bore.

2. The bearing of claim 1, wherein the indexing feature is configured to engage the surrounding housing to maintain the outer periphery in a predetermined orientation against rotation about the center of the outer periphery.

3. The bearing of claim 1, wherein the tilting pad is pin mounted.

4. The bearing of claim 1, wherein the tilting pad is mounted on a spherical seat.

5. The bearing of claim 1, wherein the center of the interior bore can be relocated by rotation of the bearing housing.

6. The bearing of claim 1, wherein the center of the interior bore can be relocated without modification to the surrounding housing.

7. The bearing of claim 1, wherein the pin is configured to extend into a recess in the surrounding housing for fixation of the bearing housing.

8. A system, comprising:
    a bearing, comprising:
        a bearing housing defining an outer periphery for contact with a surrounding housing, wherein the bearing housing defines an interior bore having a center eccentric from a center of the outer periphery;
        an indexing feature connected to the bearing housing, wherein the indexing feature is configured to engage the surrounding housing to maintain the outer periphery in a predetermined orientation against axial movement along an axis aligned with the center of the bore, and wherein the indexing feature comprises a plurality of spaced bores on the outer periphery and a pin to be selectively inserted into one of the bores; and
        at least one tilting pad oriented toward the interior bore; and the surrounding housing, wherein the surrounding housing supports two bearings and a shaft extending through the interior bores, whereupon rotation of one or both of the bearing housings can alter an orientation of the shaft.

9. The system of claim 8, wherein the shaft is moved vertically resulting from rotation of at least one bearing housing.

10. The system of claim 8, wherein the shaft is moved horizontally resulting from rotation of at least one bearing housing.

11. The system of claim 8, wherein the shaft is moved obliquely resulting from rotation of at least one bearing housing.

12. A system, comprising:
    a plurality of bearing housings, wherein each bearing housing comprises an outer periphery and an interior bore having a center eccentric from a center of the outer periphery;
    a surrounding housing configured to rotatably support the bearing housings, wherein the outer periphery comprises a plurality of bores configured to receive a pin for fixing the bearing housing in relation to the surrounding housing; and
    a shaft extending through the interior bores, wherein rotation of at least one bearing housing can alter the orientation of the shaft such that the shaft is moved obliquely.

13. The system of claim 12, wherein the bearing housings can be rotated without modification to the surrounding housing.

14. The system of claim 12, wherein the bearing housing comprises an indexing feature configured to fix the bearing housing in relation to the surrounding housing.

15. A bearing, comprising:
    a bearing housing defining an outer periphery for contact with a surrounding housing, wherein the bearing housing defines an interior bore having a center eccentric from a center of the outer periphery;
    a plurality of bores around the outer periphery of the bearing housing, wherein the plurality of bores are configured to receive a pin to fix the bearing housing in relation to the surrounding housing; and
    at least one tilting pad oriented toward the interior bore.

16. The bearing of claim 15, wherein the tilting pad is pin mounted.

17. The bearing of claim 15, wherein the tilting pad is mounted on a spherical seat.

18. The bearing of claim 15, wherein the center of the interior bore can be relocated by rotation of the bearing housing.

19. A system, comprising:
    a plurality of bearing housings, wherein each bearing housing comprises an outer periphery and an interior bore having a center eccentric from a center of the outer periphery;
    a surrounding housing configured to rotatably support the bearing housings, wherein the outer periphery comprises a plurality of bores configured to receive a pin for fixing the bearing housing in relation to the surrounding housing; and
    a shaft extending through the interior bores, wherein rotation of at least one bearing housing can alter the angle of the shaft relative to an axis between the centers of the outer peripheries.

* * * * *